United States Patent [19]

Aoshima

[11] Patent Number: 5,335,036
[45] Date of Patent: Aug. 2, 1994

[54] SHUTTER DEVICE FOR CAMERA

[75] Inventor: Chikara Aoshima, Kanagawa, Japan

[73] Assignee: Canon Kabushiki Kaisha, Tokyo, Japan

[21] Appl. No.: 24,679

[22] Filed: Mar. 1, 1993

[51] Int. Cl.$^5$ .............................................. G03B 9/40
[52] U.S. Cl. ............................................................. 354/246
[58] Field of Search ....................... 354/241, 242, 246

[56] References Cited

U.S. PATENT DOCUMENTS

| | | | |
|---|---|---|---|
| 4,099,192 | 7/1978 | Aizawa et al. | 354/234 |
| 4,130,357 | 12/1978 | Erlichman et al. | 354/241 |
| 4,150,890 | 4/1979 | Nakagawa et al. | 354/246 |
| 4,494,844 | 1/1985 | Fujino et al. | 354/241 |
| 4,629,302 | 12/1986 | Wilcox | 354/242 |
| 4,671,637 | 6/1987 | Toyoda | 354/234.1 |

FOREIGN PATENT DOCUMENTS 56-147135 11/1981 Japan .

*Primary Examiner*—Michael L. Gellner
*Assistant Examiner*—Nicholas J. Tuccillo
*Attorney, Agent, or Firm*—Robin, Blecker, Daley & Driscoll

[57] ABSTRACT

A shutter device for a camera includes shutter blades arranged to be movable to a first position in which the shutter closes and to a second position in which the shutter opens, and a switching part arranged to change a clearance provided between the shutter blades along an optical axis from a first state over to a second state in which the clearance is narrower than in the first state.

27 Claims, 8 Drawing Sheets

SHUTTER DEVICE FOR CAMERA

BACKGROUND OF THE INVENTION

1. Field of the Invention

This invention relates to a shutter device for a camera of the kind having a plurality of shutter blades and to the camera having the shutter device of this kind.

2. Description of the Related Art

The conventional shutter device for a camera has been arranged as shown in FIGS. 11 and 12. Referring to these figures, the shutter device comprises shutter blades 401 and 402, a blade retaining plate 403 in which an aperture part 403a is formed to give a maximum aperture diameter, a shutter base plate 404, and a driving pin 405 which is arranged to be caused to drive the shutter in the direction of arrow E by a known driving device.

The shutter blades 401 and 402 respectively have holes 401a and 402a rotatably fitted on fulcrum pins 404a and 404b which are provided on the shutter base plate 404. The driving pin 405 is slidably fitted into slots 401b and 402b which are respectively formed in the shutter blades 401 and 402. The blade retaining plate 403 is mounted on the shutter base plate 404 by screws (not shown) or an adhesive or the like with some clearance left between them in such a way as to allow the shutter blades 401 and 402 to turn respectively around the fulcrum pins 404a and 404b. The shutter blades 401 and 402 are thus arranged to be caused to turn by the movement of the driving pin 405 in the direction of arrow E in such a way as to form an aperture or to close the aperture.

FIG. 12 shows in a plan view the shutter blades 401 and 402 in relation to the aperture part 403a. The illustration shows the shutter blades 401 and 402 in their positions closing the aperture part 403a.

In order to perfectly prevent the film from being exposed to light with the aperture part 403a closed by the shutter blades 401 and 402, the shutter blades 401 and 402 must be arranged to be adequately overlapping the blade retaining plate 403 (a dimension "b" shown in FIG. 12) and also to adequately overlap each other (a dimension "a" shown in FIG. 12). However, clearances are provided in accordance with the conventional arrangement between the shutter base plate 404, the shutter blade 401, the shutter blade 402 and the blade retaining plate 403 for smooth rotation of the shutter blades. To prevent external light from coming round through these clearances to the surface of the film, therefore, the mutual overlapping amount of the shutter blades 401 and 402 (the dimension "a") and the overlapping amount of the blade retaining plate 403 and the shutter blades 401 and 402 (the dimension "b") must be arranged to be sufficiently large. These large overlapping amounts, however, have been impedimental to a reduction in size of the shutter device.

SUMMARY OF THE INVENTION

It is one aspect of this invention to provide a shutter device or a camera having a shutter device which permits reduction in size of a plurality of shutter blades by virtue of switching means arranged to change the mutual overlapping parts of the shutter blades from a closely contacting state over to a state of being released from the closely contacting state and vice versa.

It is another aspect of this invention to provide a shutter device or a camera having a shutter device which permits reduction in size of a plurality of shutter blades by virtue of switching means arranged to change the state of shutter blades from a state of being closely contacting an adjacent member over to a state of being released from the closely contacting state.

These and other aspects and features of this invention will become apparent from the following detailed description of embodiments thereof taken in conjunction with the accompanying drawings.

DETAILED DESCRIPTION OF THE PREFERRED EMBODIMENTS

Figure 1:
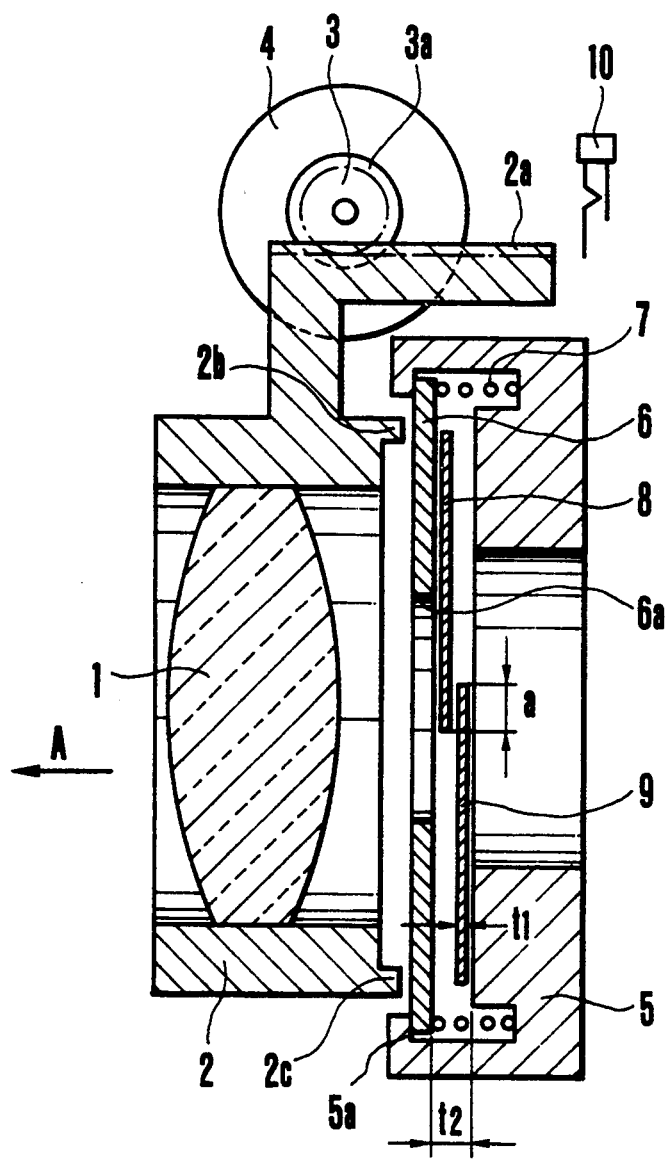
FIG. 1 is a sectional view showing a shutter device arranged according to this invention as a first embodiment thereof in a state of having shutter blades not in a closely contacting state.
Figure 2:
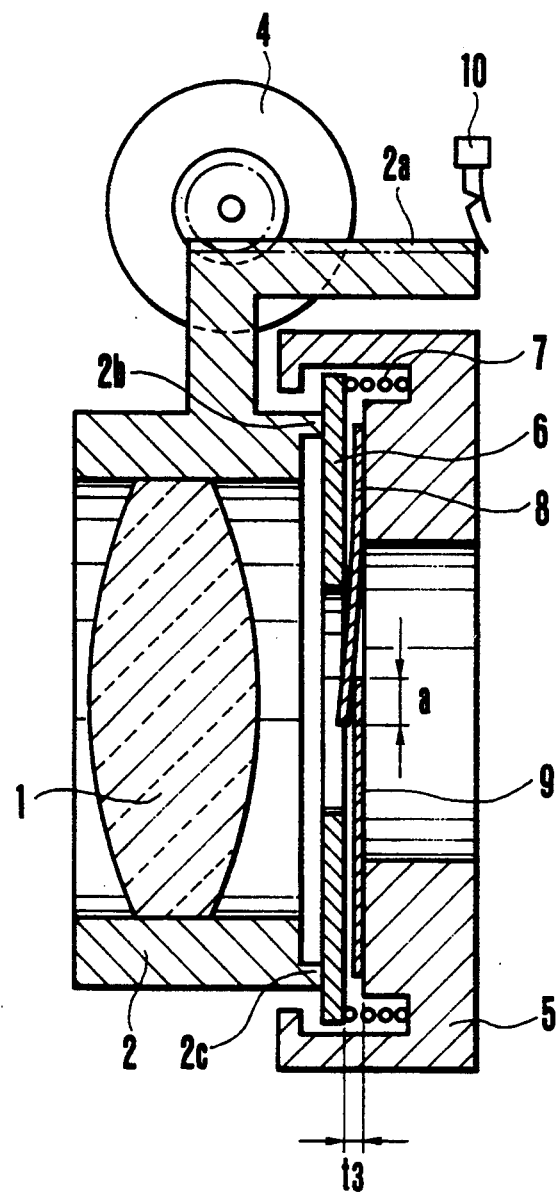
FIG. 2 is a sectional view showing the shutter blades of the shutter device of FIG. 1 in the closely contacting state.

FIGS. 1 to 6 show a first embodiment of this invention. Of these drawings, FIGS. 1 and 2 are sectional views showing a photo-taking lens 1 and a shutter device part of a camera. Referring to FIGS. 1 and 2, the photo-taking lens 1 and a lens holding member 2 which carries the photo-taking lens 1 are movably mounted on a camera body (not shown) in such a way as to be movable in the direction of arrow A and in the direction reverse thereto. A driving gear 3 is provided with gear teeth 3a which engage a rack part 2a of the lens holding member 2. A known stepping motor 4 has the driving gear 3 secured to its output shaft. The lens holding member 2 is thus arranged to be moved in the direction of arrow A or in the direction reverse thereto by the rotation of the stepping motor 4. A shutter base plate 5 is mounted on the camera body. A blade retaining plate 6 has an aperture part 6a which is arranged to give a maximum aperture diameter. A compression spring 7 is arranged to act between the shutter base plate 5 and the blade retaining plate 6 so as to urge the blade retaining plate 6 in the direction of arrow A. In the state shown in FIG. 1, the blade retaining plate 6 is in a position of abutting on an engaging rib 5a of the shutter base plate 5.

Shutter blades 8 and 9 are made of an elastic deformable (flexible) material and are disposed within a clearance provided between the shutter base plate 5 and the blade retaining plate 6. With this clearance assumed to be t2 and the plate thickness of each of the shutter blades 8 and 9 to be t1, there is obtained a relation of "t2>2·t1", so that the shutter blades 8 and 9 can be caused to smoothly turn in such a way as to form an aperture or to close the aperture in the same manner as the conventional shutter device. However, the mutual overlapping amount "a" of the shutter blades 8 and 9 of this embodiment of the invention is arranged to be less than that of the conventional shutter blades. Therefore, the shutter device can be more compactly arranged. This embodiment is arranged, as will be described later herein, to allow no leak of light to reach the film surface despite the smaller overlapping amount "a".

A position detecting switch 10 is disposed in a position to be capable of abutting on an end face of the rack part 2a of the lens holding member 2. The switch 10 is in a non-closed state in the state of FIG. 1. The photo-taking lens 1 used for this embodiment is arranged to perform a focusing action on an object in a position obtained by moving it in the direction of arrow A from its position shown in FIG. 1, i.e., to the left as viewed on FIG. 1.

FIG. 2 shows a state obtained by rotating the stepping motor 4 leftward from the state of FIG. 1. The leftward rotation of the stepping motor 4 from the state of FIG. 1 causes the lens holding member 2 to move to the right. The lens holding member 2 comes to abut on the blade retaining plate 6 at projections 2b and 2c which are formed at the rear end of the lens holding member 2. The lens holding member 2 then pushes and causes the blade retaining plate 6 to the right against the urging force of the compression spring 7. The position detecting switch 10 is closed by the end face of the rack part 2a of the lens holding member 2. With the position detecting switch 10 thus closed, the rotation of the stepping motor 4 is brought to a stop by a control circuit (see FIG. 2).

In the state shown in FIG. 2, the clearance between the blade retaining plate 6 and the shutter base plate 5 becomes t3. The clearance t3 is smaller than the clearance t2 mentioned above and thus leaves no clearance for the overlapping parts of the shutter blades 8 and 9, causing the shutter blades 8 and 9 to be in close contact with each other between the blade retaining plate 6 and the shutter base plate 5. With the embodiment in this state, light never leaks onto the film surface even if the shutter blades 8 and 9 are arranged to overlap each other only to a small extent.

Figure 12:
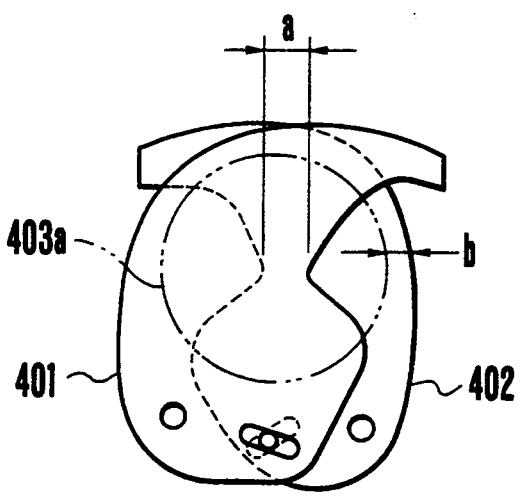
FIG. 12 is a plan view showing the shutter blades of the shutter device shown in FIG. 11.

Further, a clearance between the blade retaining plate 6 and the shutter blades 8 and 9 is also smaller in the state of FIG. 2. Therefore, external light never leaks onto the film surface through the clearance between the blade retaining plate 6 and the shutter blades 8 and 9 even if the shutter blades 8 and 9 are arranged to overlap the blade retaining plate 6 only to a small extent. The arrangement of this embodiment thus permits reduction of the overlapping amount "a" between the shutter blades 8 and 9 and also an overlapping amount between the blade retaining plate 6 and the shutter blades 8 and 9 (the dimension "b" shown in FIG. 12), so that the shutter device can be arranged to have a smaller outside dimension.

Figure 3:
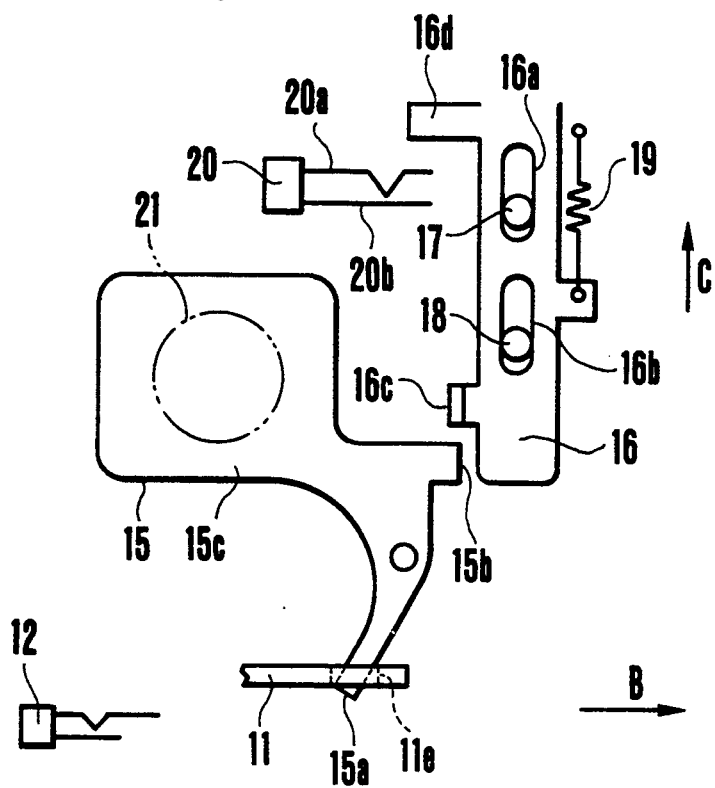
FIG. 3 is a rear view showing various parts around a barrier in a closed state thereof.
Figure 4:
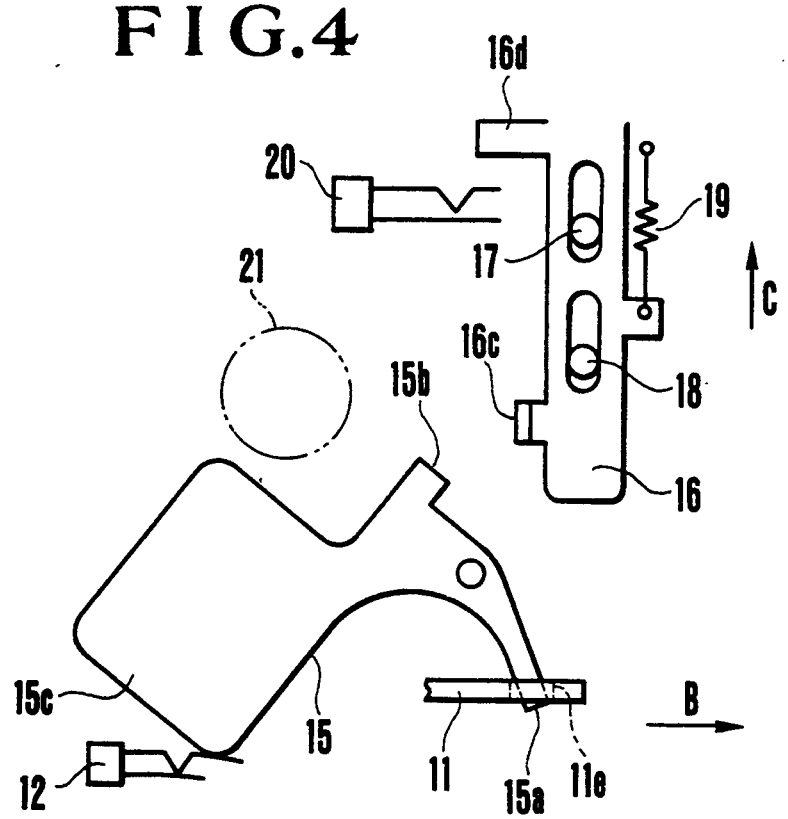
FIG. 4 shows the open state of the barrier.

FIGS. 3 and 4 are plan views showing other parts of the embodiment as viewed from the film surface side toward an object to be photographed. Referring to FIGS. 3 and 4, an operation lever 11 is mounted on the camera body which is not shown. The operation lever 11 is movable either in the direction of arrow B or in the direction reverse thereto and is arranged to be operable directly by the operator of the camera. A barrier member (lens cover) 15 is swingably mounted either on the camera body which is not shown or on a cover which is also not shown. An arm part 15a of the barrier member 15 is fitted in a slot 11e which is formed in the operation lever 11. The barrier member 15 is thus arranged to be turned by the movement of the operation lever 11 from its position shown in FIG. 3 to a position shown in FIG. 4. A release lever 16 has slots 16a and 16b. The slots 16a and 16b of the release lever 16 are slidably fitted on shafts 17 and 18 which are provided on the camera body. A spring 19 which is provided for the release lever 16 has its one end attached to the camera body and the other end to the release lever 16. The spring 19 is thus arranged to urge the release lever 16 in the direction of arrow C as shown in FIG. 3.

A release switch 20 consists of contact pieces 20a and 20b and is arranged to cause a shutter release action to begin with the contact pieces 20a and 20b coming into contact with each other. The contact piece 20a is arranged to be capable of engaging an arm part 16d of the release lever 16. In the state of FIG. 3, however, the release lever 16 cannot be manually pushed down in the direction reverse to the direction of arrow C against the urging force of the spring 19 as a bent-up part 16c of the release lever 16 then comes to abut on a stopper part 15b of the barrier member 15 and to prevent any further downward movement of the release lever 16. When the device is in the state of FIG. 3, therefore, since the arm part 16d of the release lever 16 does not abut on the contact piece 20a, the contact piece 20a cannot be brought into contact with the contact piece 20b and no shutter release action of the camera is performed. Reference numeral 21 denotes an optical path of the photo-taking lens 1.

FIG. 3 shows a barrier part 15c of the barrier member 15 in a state of covering the photo-taking lens 1 to protect the photo-taking lens 1.

A barrier detecting switch 12 is mounted on the camera body which is not shown. This switch 12 is arranged to be in a non-closed state when the barrier member 15 is in the position of covering the photo-taking lens 1 and to be closed by having a part of the barrier member 15 abutting thereon when the barrier member 15 is moved from the position of FIG. 3 to a position shown in FIG. 4 away from the optical path 21 of the photo-taking lens 1. When the operation lever 11 is operated to move it in the direction of arrow B, the barrier member 15 turns to the left to move away from the optical path 21 of the photo-taking lens 1 and comes to close the barrier detecting switch 12 as shown in FIG. 4. Under this condition, the stopper part 15b of the barrier member 15 is located outside the moving locus of the bent-up part 16c of the release lever 16 to allow the camera to perform a shutter release action.

Figure 5:
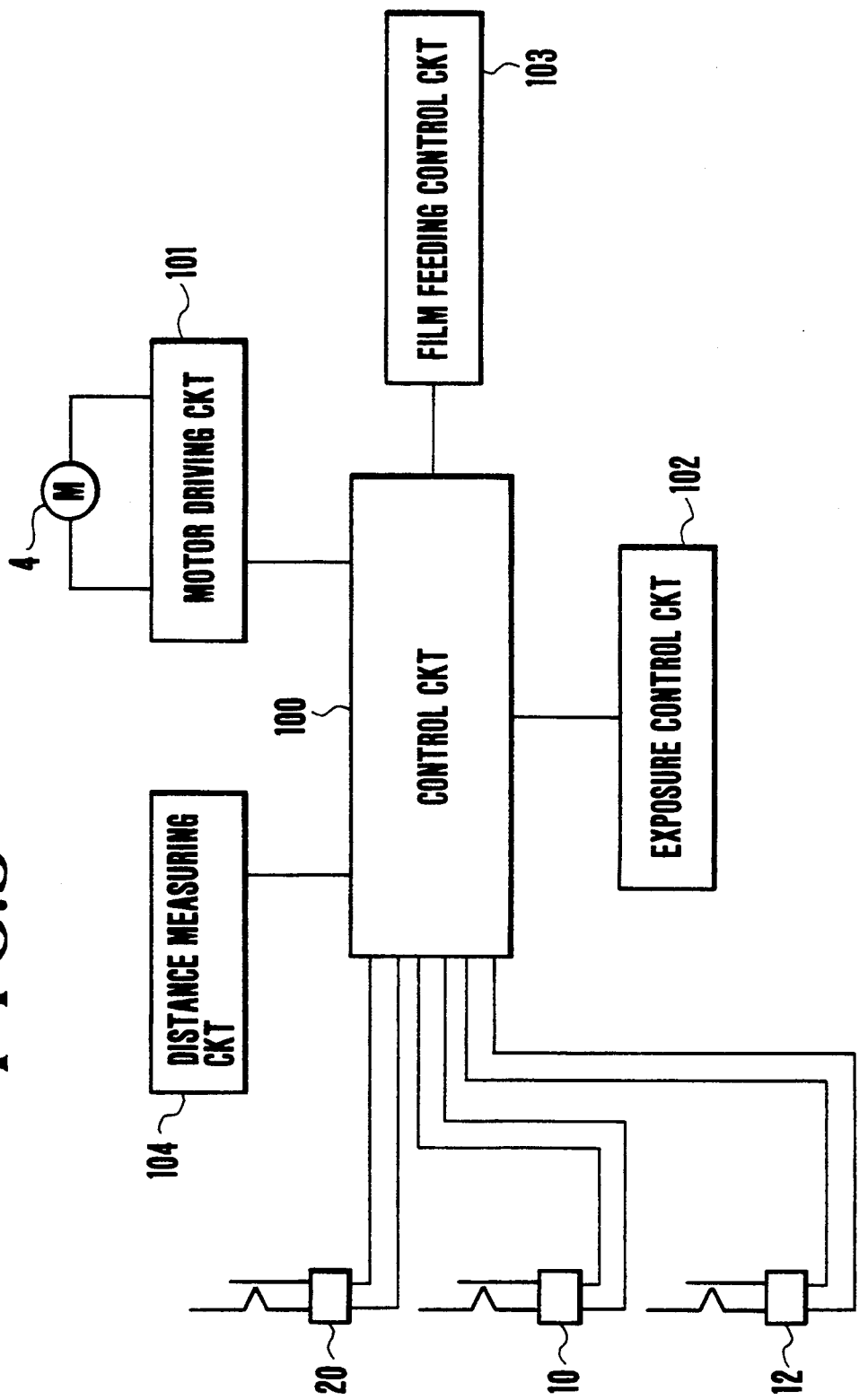
FIG. 5 is a block diagram showing a control circuit of the shutter device shown in FIG. 1.

FIG. 5 is a block diagram showing the electric circuits of the camera. Referring to FIG. 5, a control circuit 100 which consists of a microcomputer, etc., is arranged to perform control over the whole sequence of actions of the camera. A motor driving circuit 101 is arranged to drive the stepping motor 4. An exposure control circuit 102 includes a known light measuring circuit and a shutter driving device and is arranged to drive and control the shutter driving device. A film feeding control circuit 103 is arranged to drive and control a known film feeding mechanism. A distance measuring circuit 104 includes a known distance measuring device for measuring a distance from the camera to an object to be photographed and is arranged to drive the distance measuring device.

Figure 6:
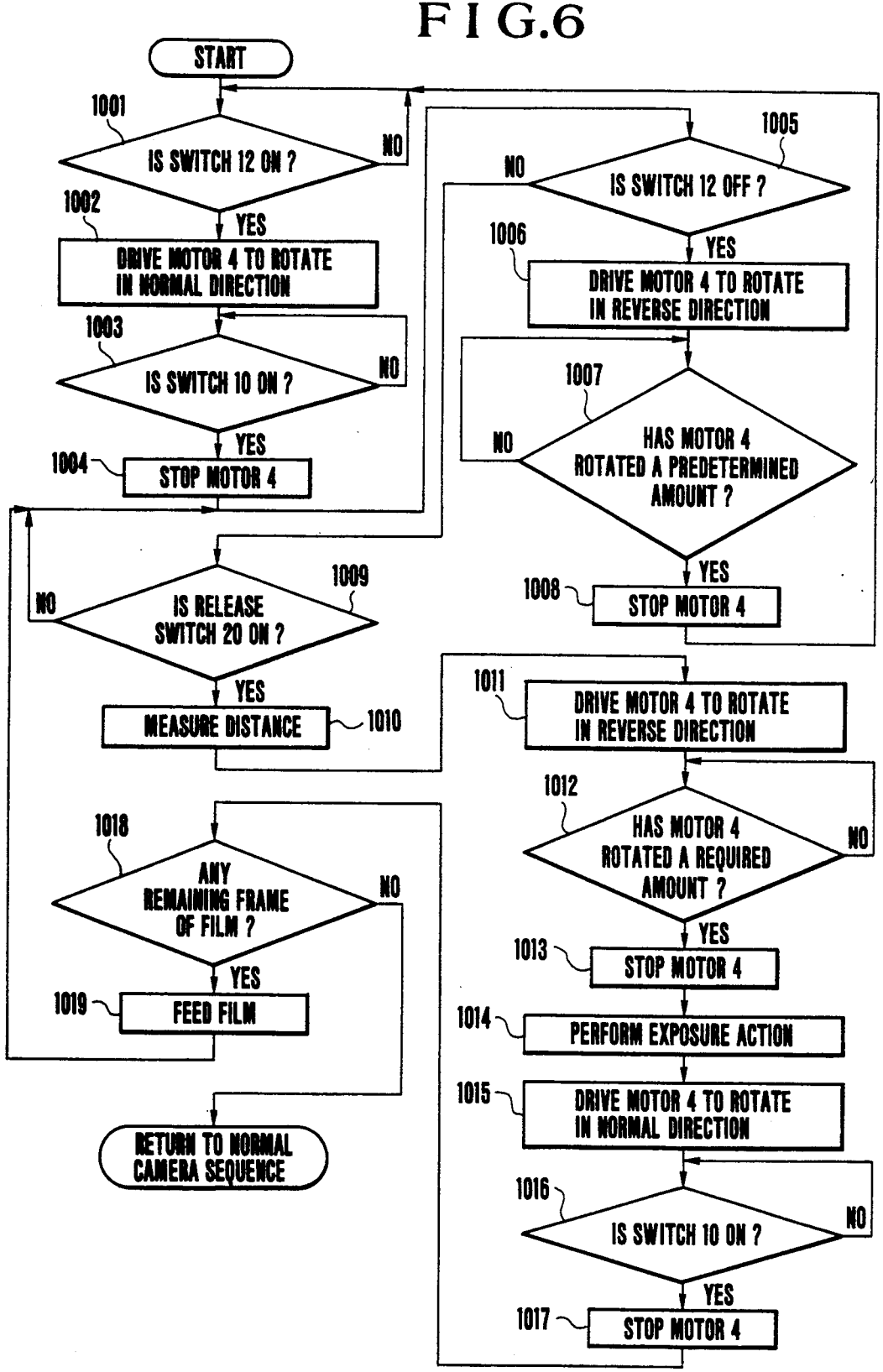
FIG. 6 is a flow chart showing the operation of the control circuit shown in FIG. 5.

The operation of the control circuit 100 is described as follows with reference to FIG. 6 which is a flow chart. This flow chart includes only such actions that relate to the features of the above-stated embodiment of this invention. Other actions are performed similarly to those of the conventional camera. At a step 1001, when the barrier detecting switch 12 turns on, the barrier member 15 is assumed to have moved from its position of FIG. 3 to its position of FIG. 4 away from the optical path 21 of the photo-taking lens 1. The flow of operation then proceeds to a step 1002. The lens holding member 2 is in a position shown in FIG. 1 until the flow comes to the step 1002. In other words, with the lens holding member 2 in this position, the shutter blades 8 and 9 are not urged through the blade retaining plate 6 to move along an optical axis. Under this condition, the barrier member 15 almost completely blocks any external light from coming toward the shutter blades 8 and 9. Therefore, no light reaches the film surface even if the overlapping amount "a" of the shutter blades 8 and 9 is small and there is some clearance between their overlapping parts. At the step 1002, the stepping motor 4 is caused to be driven by the motor driving circuit 101 to rotate in a normal direction (leftward rotation). At a step 1003, with the lens holding member 2 moved from its position of FIG. 1 to the right, the end face of the rack part 2a comes to close the position detecting switch 10. When the switch 10 is thus closed, the flow proceeds to a step 1004.

At the step 1004, the rotation of the stepping motor 4 is brought to a stop through the motor driving circuit 101. Then, there is obtained the state of FIG. 2. When the shutter device is in this state, the shutter blades 8 and 9 are in close contact with each other at their overlapping parts, leaving no clearance between them as mentioned in the foregoing. Therefore, no light is allowed to reach the film surface.

At a step 1005, a check is made for a closed state of the barrier member 15. If the barrier detecting switch 12 is off, the barrier member 15 is assumed to have resumed its position of covering the photo-taking lens 1 as shown in FIG. 3 and the flow comes to a step 1006. If the barrier detecting switch 12 is on, the barrier member 15 is assumed to be in the position of FIG. 4 and the flow comes to a step 1009. At the step 1006, the stepping motor 4 is caused to rotate in a normal direction (rightward rotation) through the motor driving circuit 101. At a step 1007, when the lens holding member 2 comes back to its position shown in FIG. 1 with the stepping motor 4 having rotated a given amount, the flow comes to a step 1008. At the step 1008, the rotation of the stepping motor 4 is stopped through the motor driving circuit 101. The flow then comes back to the step 1001.

At the step 1009, a check is made to find if the release switch 20 has turned on. If so, the flow proceeds to a step 1010 with a shutter release action assumed to have been performed. If the release switch 20 is found to be off, the flow comes back to the step 1005. At the step 1010, the distance measuring circuit 104 is driven to measure a distance to the object to be photographed. At a step 1011, the stepping motor 4 is caused to rotate in the reverse direction (rightward rotation) through the motor driving circuit 101. The lens holding member 2 then moves to the left from its position of FIG. 2. At a step 1012, the lens holding member 2 is caused to move to a position corresponding to the object distance measured at the step 1010. With the lens holding member 2 having moved to this position, the flow comes to a step 1013. At the step 1013, the rotation of the stepping motor 4 is brought to a stop through the motor driving circuit 101. As mentioned in the foregoing, the lens holding member 2 is always located on the left side of its position shown in FIG. 1 with the shutter device in this state. Therefore, the blade retaining plate 6 is then in a position of being pushed against the rib 5a of the shutter base plate 5 by the urging force of the compression spring 7. Under this condition, the shutter blades 8 and 9 are within the clearance t2, which permits the shutter blades 8 and 9 to be smoothly driven.

At a step 1014, an exposure action is performed on the film by driving the shutter blades 8 and 9 through the exposure control circuit 102. At a step 1015, the stepping motor 4 is caused to rotate in the normal direction (leftward rotation) through the motor driving circuit 101. At a step 1016, the end face of the rack part 2a of the lens holding member 2 comes to close the position detecting switch 10 with the lens holding member 2 moved to the right. With the position detecting switch 10 thus closed, the flow comes to a step 1017. At the step 1017, the stepping motor 4 is caused to stop rotating through the motor driving circuit 101. Then, there is obtained the state of FIG. 2. In this state, the overlapping parts of the shutter blades 8 and 9 are in close contact with each other, leaving no clearance between them and no external light is allowed to reach the film surface.

At a step 1018, a check is made in a known manner to find if there is any remaining frame portion of the film. If not, the flow comes to the routine of control over the normal sequence of camera actions such as film rewinding, etc. If any remaining frame portion of the film is found, the flow comes to a step 1019. At the step 1019, the film feeding control circuit 103 is driven to wind up the film for a next frame. After that, the flow comes back to the step 1005.

In addition, the lens holding member 2 may be arranged to always urge the shutter blades 8 and 9 along the optical axis under a non-shooting condition and the camera may be arranged to cancel the urging action in response to a shutter release operation. In other words, the camera does not have to be always arranged to drive the lens holding member 2 in association with the movement of the barrier member 15 as described in the foregoing.

Figure 7:
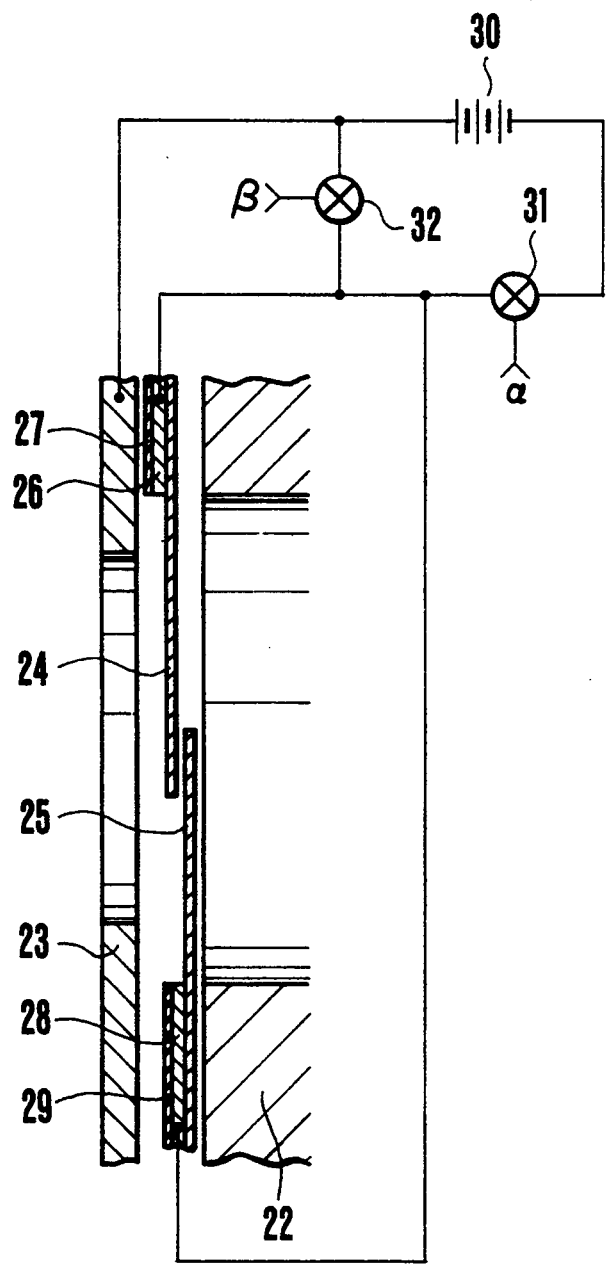
FIG. 7 is a sectional view showing a second embodiment of this invention.

FIG. 7 shows a second embodiment of this invention. The illustration includes a shutter base plate 22, a blade retaining plate 23 which is made of a conductive material such as a metal and is fixedly mounted with a clearance left between the blade retaining plate 23 and the shutter base plate 22, shutter blades 24 and 25, electrode parts 26 and 28 which are secured respectively to the shutter blades 24 and 25 and made of a conductive material such as a metal with insulating high-permittivity dielectric layers 27 and 29 of, for example, polyethylene terephthalate formed on their surfaces located opposite to the blade retaining plate 23, a power supply 30, and a switch 31 which is arranged between the power supply 30 and the electrode parts 26 and 28 of the shutter blades 24 and 25 to become conductive or nonconductive. The state of the switch 31 can be changed from a conductive state over to a nonconductive state and vice versa by means of a control signal "a".

Another switch 32 is arranged between the electrode parts 26 and 28 of the shutter blades 24 and 25 and the blade retaining plate 23 to become conductive or nonconductive. The state of this switch 32 can be changed from a conductive state over to a nonconductive state and vice versa by means of a control signal "β". When the switch 31 is caused to be in the conductive state and the other switch 32 is caused to be in the nonconductive state (hereinafter, this switching condition will be called a state A), a positive electric charge is accumulated in the blade retaining plate 23 and a negative electric charge is accumulated in the electrode parts 26 and 28 of the shutter blades 24 and 25. As a result, the shutter blades 24 and 25 are attracted toward the blade retaining plate 23 by the force of static electricity to bring the shutter blades 24 and 25 into close contact with the blade retaining plate 23, leaving almost no clearance between them. Under this condition, external light never leaks to come to the film surface even though the mutual overlapping amount of the shutter blades 24 and 25 is small and the overlapping amount of the blade retaining plate 23 and the shutter blades 24 and 25 is small.

When the switch 31 is caused to be in the nonconductive state and the other switch 32 is caused to be in the conductive state (that condition hereinafter will be called a state B), the electric potential of the blade retaining plate 23 becomes equal to those of the shutter blades 24 and 25. No force of static electricity acts and the shutter device comes back to the state shown in FIG. 7 to render the shutter blades 24 and 25 smoothly turnable.

The second embodiment is thus arranged to permit switching between the above-stated states A and B in a manner similar to the first embodiment to attain the same effect as the first embodiment. More specifically, the control circuit is arranged as follows: the device is brought into the state A in association with the opening movement of the barrier member and, after that, is switched over to the state B either in association with the closing action of the release switch or during the process of drawing out the lens for focusing. After completion of an exposure, the state B is switched over to the state A. Further, the state A is again switched over to the state B in association with the closing movement of the barrier member.

Figure 8:
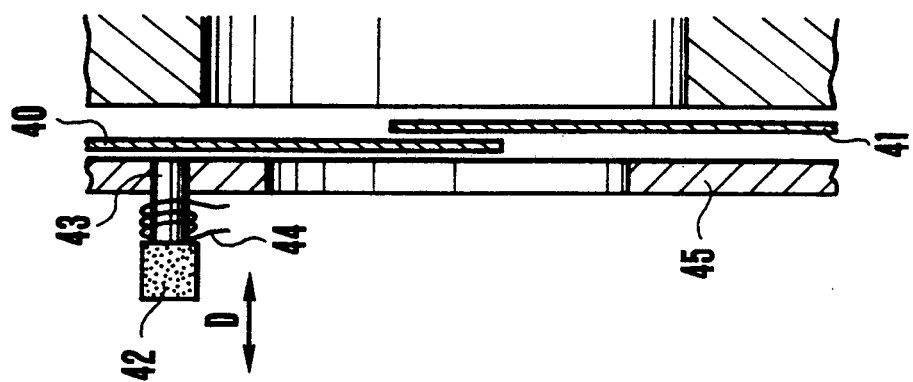
FIG. 8 is a sectional view showing a third embodiment of this invention.

A third embodiment of the invention is arranged as shown in FIG. 8. Referring to FIG. 8, shutter blades 33 and 34 have bases 33a and 34a. Each of the shutter blade bases 33a and 34a is provided with insulating, high-permittivity dielectric layers 33b and 33c or 34b and 34c, which are formed both on the front and rear sides of the base 33a or 34a. Similarly to the case of the second embodiment, one of the bases 33a and 34a is arranged to accumulate a positive electric charge while the other is arranged to accumulate a negative electric charge. These electric charges cause the shutter blades 33 and 34 to pull each other into close contact to effectively prevent any leak of light from coming to the film surface through these shutter blades 33 and 34. Further, the third embodiment is arranged such that, in driving the shutter blades 33 and 34, these bases 33a and 34a are rendered conductive to prevent the force of static electricity from acting any longer. This arrangement makes the shutter blades 33 and 34 smoothly turnable with the shutter device brought back to a state shown in FIG. 8.

Figure 9:
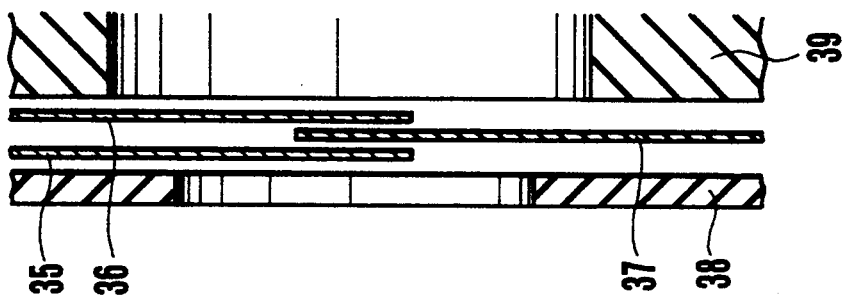
FIG. 9 is a sectional view showing a fourth embodiment of this invention.

A fourth embodiment of the invention is arranged as shown in FIG. 9. In the case of this embodiment, the invention is applied to a shutter device having at least three shutter blades. Referring to FIG. 9, shutter blades 35 and 36 are made of a conductive material. A shutter blade 37 is made of an insulating, high-permittivity material and is disposed between the shutter blades 35 and 36. A blade retaining plate 38 is made of an insulating material. A shutter base plate 39 is also made of an insulating material. Similarly to the second embodiment, one of the shutter blades 35 and 36 is arranged to accumulate a positive electric charge while the other is arranged to accumulate a negative electric charge. The arrangement is such that, the shutter blades 35 and 36 pull each other across the shutter blade 37 in such a way as to bring the three shutter blades 35, 36 and 37 into close contact one another, so that light can be prevented from leaking through them. Further, in driving these shutter blades 35, 36 and 37, the force of static electricity is no longer allowed to act by rendering the shutter blades 35 and 36 conductive, so that the shutter blades 35, 36 and 37 can be made to be smoothly turnable.

Figure 10:
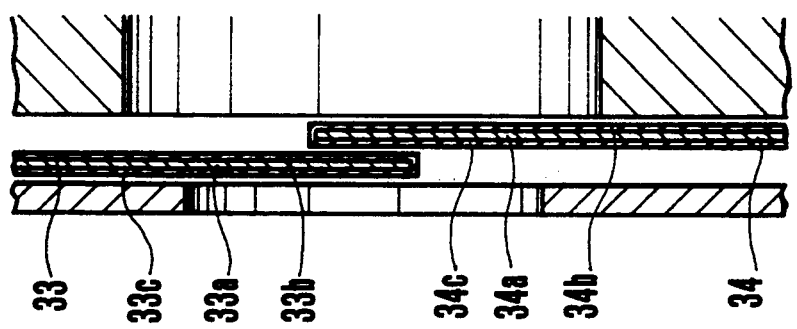
FIG. 10 is a sectional view showing a fifth embodiment of this invention.
Figure 11:
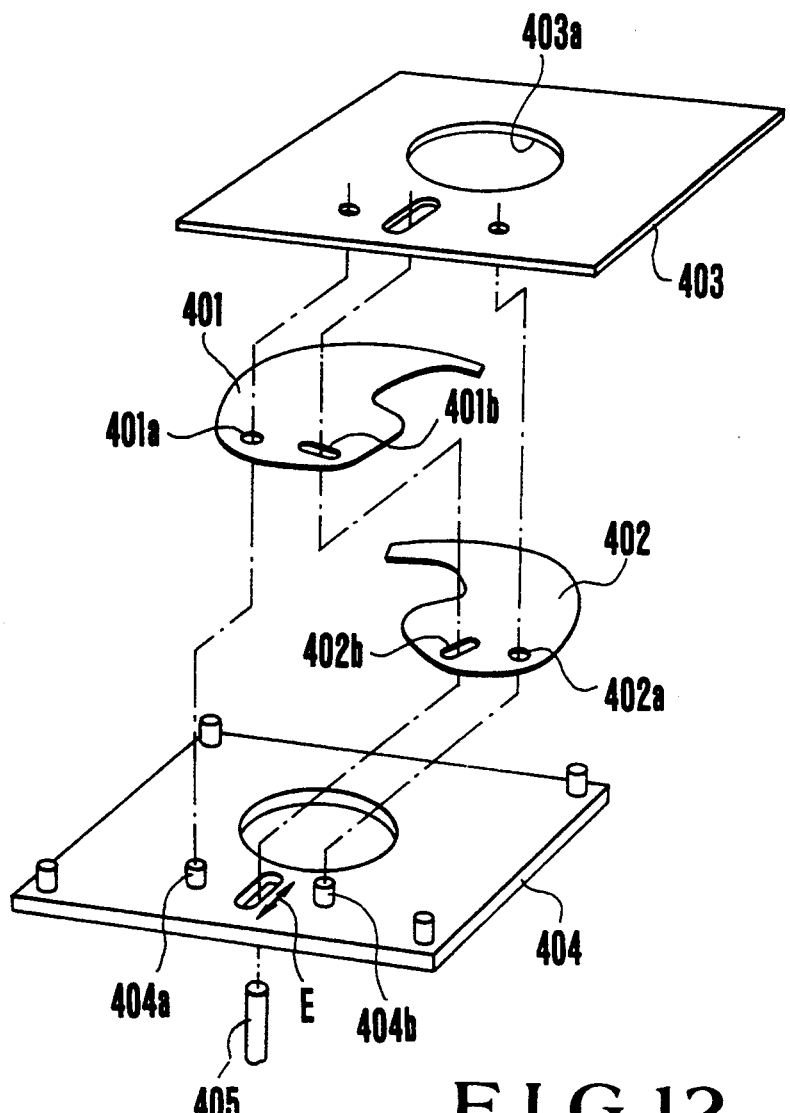
FIG. 11 is an exploded oblique view showing the conventional shutter device.

A fifth embodiment of this invention is arranged as shown in FIG. 10. Referring to FIG. 10, shutter blades 40 and 41 are made of a high magnetic permeability material. A permanent magnet 42 is magnetized in the direction of the optical axis of a photo-taking lens which is not shown, i.e., in the direction of arrow D. A yoke 43 is made of a high magnetic permeability material and is arranged to have one end thereof opposed to the permanent magnet 42 and the other end to the shutter blade 40. The embodiment further comprises a coil 44 which is wound around the yoke 43, and a blade retaining plate 45.

When the coil 44 is not energized, the shutter blades 40 and 41 are attracted toward the blade retaining plate 45 by the magnetic force of the permanent magnet 42. As a result, a clearance between the shutter blades 40 and 41 and a clearance between the blade retaining plate 45 and the shutter blades 40 and 41 disappear, so that external light can be prevented from leaking and coming to the film surface.

In driving the shutter blades 40 and 41, a current is caused to flow through the coil 44 in the direction of canceling out the magnetic force of the permanent magnet 42. As a result, the shutter blades 40 and 41 are freed from their states of being attracted to render them smoothly turnable.

The shutter device can be arranged, by virtue of the arrangement of the embodiments described, to have a small overlapping amount of the shutter blades when the shutter is in its closed state. The arrangement thus permits reduction of the external dimension of the shutter device.

Further, the camera having this shutter device can be also arranged in a compact size as a whole.

Further, since the switch-over from one state in which the shutter blades are in close contact with each other and also with the blade retaining plate to the other state in which they are freed from the close contact and vice versa is arranged to be effected in association with the movement of an optical member such as a lens holding frame, the camera can be arranged to effectively inhibit the intrusion of external light in accordance with the sequence of actions to be performed by the camera.

What is claimed is:

1. A shutter device for a camera, comprising:

a) a plurality of shutter blades arranged to be movable to a first position for closing and to a second position for opening; and b) switching means for changing a clearance provided between said plurality of shutter blades along an optical axis from a first state over to a second state in which said clearance is narrower than in said first state, said switching means being capable of changing from said first state to said second state at the first position of said plurality of shutter blades.

2. A device according to claim 1, wherein said switching means is capable of changing from said second state to said first state at the first position of the plurality of shutter blades.

3. A device according to claim 2, wherein said switching means is arranged to change said clearance from said first state over to said second state by moving a moving member in a first direction along the optical axis in such a way as to push at least one of said plurality of shutter blades, and to change said clearance from said second state over to said first state by moving said moving member in a second direction along the optical axis in such a way as to free said at least one of plurality of shutter blades from being pushed.

4. A device according to claim 1, wherein, in said second state, said plurality of shutter blades are arranged to be in close contact with each other along the optical axis.

5. A device according to claim 2, wherein, in said second state, said plurality of shutter blades are arranged to be in close contact with each other along the optical axis.

6. A device according to claim 3, wherein said moving member is arranged to be urged in said second direction by an urging mechanism.

7. A device according to claim 1, wherein said switching means is arranged to use a magnetic force.

8. A device according to claim 1, wherein said switching means is arranged to use the force of static electricity.

9. A device according to claim 7, wherein said plurality of shutter blades are made of a material having a high magnetic permeability, and wherein said first state is arranged to be changed over to said second state by attracting said plurality of shutter blades in one direction with a magnetic force.

10. A device according to claim 8, wherein each of said plurality of shutter blades has a base made of a conductive material and dielectric layers having a high permittivity formed on surfaces of the base, and wherein said first state is arranged to be changed over to said second state by attracting said plurality of shutter blades toward a conductive member adjacent thereto with the force of static electricity obtained by accumulating electric charge in said conductive member.

11. A device according to claim 8, wherein each of said plurality of shutter blades has a base made of a conductive material and dielectric layers having a high permittivity formed on surfaces of the base, and wherein said first state is changed over to said second state by bringing said plurality of shutter blades into close contact with each other with a positive electric charge accumulated in one of said plurality of shutter blades and a negative electric charge accumulated in the other.

12. A camera having a shutter device, comprising:

a) a plurality of shutter blades arranged to be movable to a first position for closing and to a second position for opening; and b) switching means for changing a clearance provided between said plurality of shutter blades along an optical axis from a first state over to a second state in which said clearance is narrower than in said first state, said switching means being capable of changing from said first state to said second state at the first position of said plurality of shutter blades.

13. A camera according to claim 12, wherein said switching means is capable of changing from said second state to said first state at said first position of the shutter blades.

14. A camera according to claim 13, wherein said switching means is arranged to change said clearance from said first state over to said second state by moving a moving member in a first direction along the optical axis in such a way as to push at least one of said plurality of shutter blades, and to change said clearance from said second state over to said first state by moving said moving member in a second direction along the optical axis in such a way as to free said at least one of plurality of shutter blades from being pushed.

15. A camera according to claim 12, wherein said switching means is arranged to use a magnetic force.

16. A camera according to claim 12, wherein said switching means is arranged to use the force of static electricity.

17. An optical apparatus having a shutter device, comprising:

a) a moving lens arranged to move in the direction of an optical axis thereof;

b) a plurality of shutter blades arranged to be movable to a first position for closing and to a second position for opening; and c) a switching mechanism arranged to change a clearance provided between said plurality of shutter blades along the optical axis from a first state over to a second state in which said clearance is narrower than in said first state, said switching mechanism being capable of changing from said first state to said second state at the first position of said plurality of shutter blades.

18. An apparatus according to claim 17, wherein said switching mechanism is capable of changing from said second state to said first state at said first position of the shutter blades.

19. An apparatus according to claim 18, wherein said switching mechanism is arranged to change said clearance from said first state over to said second state by pushing at least one of said plurality of shutter blades in association with the movement of said moving lens in a first direction along the optical axis, and to change said clearance from said second state over to said first state by freeing said at least one of plurality of shutter blades from being pushed in association with the movement of said moving lens in a second direction along the optical axis.

20. An apparatus according to claim 19, wherein said switching mechanism is arranged to push said at least one of plurality of shutter blades by moving a moving member adjacent to said plurality of shutter blades in association with the movement of said moving lens along the optical axis.

21. An apparatus according to claim 20, wherein a shutter retaining member in which an aperture is formed is employed as said moving member.

22. An apparatus according to claim 18, wherein said moving lens is a lens for focus adjustment.

23. An apparatus according to claim 19, wherein said moving lens is a lens for focus adjustment.

24. An apparatus according to claim 23, wherein said lens for focus adjustment is located outside a normal focus adjustment range when said clearance is in said second state.

25. An apparatus according to claim 24, wherein, when a release member is operated, said lens for focus adjustment is moved from its position obtained with said clearance in said second state to a position obtained with said clearance in said first state.

26. An apparatus according to claim 19, further comprising:
 a barrier arranged to change a position thereof between a closing position for blocking an optical path of said moving lens and an open position for freeing said optical path from being blocked; and
 control means arranged to move said moving lens in response to a change of the position of said barrier.

27. An apparatus according to claim 26, wherein said switching mechanism is arranged to bring said clearance into said first state when said barrier is in said closing position and to change said clearance from said first state over to said second state when the position of said barrier is changed to said open position.

* * * * *

UNITED STATES PATENT AND TRADEMARK OFFICE
CERTIFICATE OF CORRECTION

PATENT NO. : 5,335,036

DATED : August 2, 1994

INVENTOR(S) : Aoshima

It is certified that error appears in the above-identified patent and that said Letters Patent is hereby corrected as shown below:

ON THE TITLE PAGE

Insert "[30] Foreign Application Priority Data
        March 05, 1992 [JP] Japan.....HEI 04-048862

Signed and Sealed this

Fifteenth Day of November, 1994

Attest:

BRUCE LEHMAN

*Attesting Officer*          *Commissioner of Patents and Trademarks*